United States Patent
Peng et al.

(10) Patent No.: US 11,630,327 B2
(45) Date of Patent: *Apr. 18, 2023

(54) CONTACT LENSES HAVING AN ION-IMPERMEABLE PORTION AND RELATED METHODS

(71) Applicant: CooperVision International Limited, Fareham (GB)

(72) Inventors: Cheng-Chun Peng, Berkeley, CA (US); Percy Lazon de la Jara, San Ramon, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 63 days.

This patent is subject to a terminal disclaimer.

(21) Appl. No.: 17/331,662

(22) Filed: May 27, 2021

(65) Prior Publication Data
US 2021/0286198 A1    Sep. 16, 2021

Related U.S. Application Data

(63) Continuation of application No. 16/164,847, filed on Oct. 19, 2018, now Pat. No. 11,029,538.

(Continued)

(30) Foreign Application Priority Data

Feb. 27, 2018  (EP) ..................................... 18158967
Feb. 27, 2018  (GB) ..................................... 1803175

(51) Int. Cl.
*G02C 7/00*   (2006.01)
*G02C 7/02*   (2006.01)
(Continued)

(52) U.S. Cl.
CPC .............. *G02C 7/049* (2013.01); *G02C 7/083* (2013.01); *G02C 7/085* (2013.01); *G02C 11/10* (2013.01)

(58) Field of Classification Search
CPC .............. G02C 7/04; G02C 7/02; G02C 7/06; G02C 7/061; G02C 7/08; G02C 5/00; A61B 5/14532; B29D 11/00826
(Continued)

(56) References Cited

U.S. PATENT DOCUMENTS 5,760,100 A    6/1998  Nicolson et al.
5,849,811 A    12/1998 Nicolson et al.
(Continued)

FOREIGN PATENT DOCUMENTS

EP    2631704 A1    8/2013
EP    2846183 A2    3/2015
(Continued)

OTHER PUBLICATIONS

Office Action issued in corresponding Chinese Patent Application No. 201880069496.4 dated Aug. 25, 2021 (with English translation) (23 pages).
(Continued)

*Primary Examiner* — Dawayne Pinkney
(74) *Attorney, Agent, or Firm* — Kilyk & Bowersox, P.L.L.C.

(57) ABSTRACT

Contact lenses that have an ion-impermeable portion and an ion-permeable portion that are able to move on the eye without binding to the eye are described. The contact lenses exhibit an average ionoflux transmittance of at least 1.34× $10^{-4}$ mm/min. One or more electronic components can be included in the contact lenses. Methods of making the contact lenses are also described.

19 Claims, 4 Drawing Sheets

Related U.S. Application Data (60) Provisional application No. 62/576,945, filed on Oct. 25, 2017.

(51) Int. Cl.
*G02C 3/00* (2006.01)
*G02C 7/04* (2006.01)
G02C 7/08 (2006.01)
G02C 11/00 (2006.01)

(58) Field of Classification Search
USPC .............. 351/159.01–159.6, 159.14, 159.39, 159.4, 351/159.73–159.74, 178; 600/319
See application file for complete search history.

(56) References Cited

U.S. PATENT DOCUMENTS

| | | |
|---|---|---|
| 10,261,342 B2 | 4/2019 | Legerton et al. |
| 2008/0174035 A1 | 7/2008 | Winterton |
| 2009/0146330 A1 | 6/2009 | Chang et al. |
| 2011/0102736 A1 | 5/2011 | Wu et al. |
| 2012/0236524 A1 | 9/2012 | Pugh et al. |
| 2013/0308093 A1 | 11/2013 | Qiu et al. |
| 2014/0005514 A1 | 1/2014 | Pugh et al. |
| 2016/0049624 A1 | 2/2016 | Bhardwaj et al. |
| 2016/0054589 A1 | 2/2016 | Otts et al. |
| 2016/0274377 A1 | 9/2016 | Toner et al. |
| 2017/0227792 A1 | 8/2017 | Starner et al. |
| 2017/0255030 A1 | 9/2017 | Etzkorn et al. |
| 2017/0293164 A1 | 10/2017 | Flitsch et al. |
| 2017/0299893 A1 | 10/2017 | Pugh et al. |
| 2018/0299701 A1 | 10/2018 | Otts |
| 2019/0121161 A1 | 4/2019 | Peng et al. |
| 2019/0293964 A1 | 9/2019 | Takaki et al. |

FOREIGN PATENT DOCUMENTS

| | | |
|---|---|---|
| EP | 2848986 A2 | 3/2015 |
| EP | 2851743 A1 | 3/2015 |
| EP | 3232252 A2 | 10/2017 |
| JP | 2000501853 A | 2/2000 |
| JP | 2016046250 A | 4/2016 |
| JP | 2016177287 A | 10/2016 |
| JP | 6174232 B1 | 8/2017 |
| JP | 2017191320 A | 10/2017 |
| WO | 9631792 | 10/1996 |
| WO | 9722019 A1 | 6/1997 |
| WO | 2010071691 A1 | 6/2010 |
| WO | 2015192079 A1 | 12/2015 |
| WO | 2016033310 A1 | 3/2016 |
| WO | 2017182817 A1 | 10/2017 |
| WO | 2018011586 A2 | 1/2018 |

OTHER PUBLICATIONS

Office Action issued in corresponding Japanese Patent Application No. 2020522871 dated Feb. 21, 2022 (with English translation) (9 pages).
Second Written Opinion issued in corresponding International Patent Application No. PCT/GB2018/053048 dated Nov. 7, 2019 (11 pages).
Examination Report issued in United Kingdom Patent Application No. GB1817177.7 dated Apr. 17, 2019 (8 pages).
Chiou et al., "A Wirelessly Powered Smart Contact Lens with Reconfigurable Wide Range and Tunable Sensitivity Sensor Readout Circuitry," Sensors, 2017, vol. 17, No. 108, pp. 1-12.
Communication Relating to the Results of the Partial International Search Report issued in corresponding International Patent Application No. PCT/GB2018/053048 dated Nov. 20, 2018 (18 pages).
International Search Report and Written Opinion issued in corresponding International Patent Application No. PCT/GB2018/053048 dated Dec. 7, 2018 (25 pages).
Peng et al., "Ion transport in silicone hydrogel contact lenses," Journal of Membrane Science, 2012, vols. 399-400, pp. 95-105 (abstract only).
Wolffsohn et al., "Simplified recording of soft contact lens fit," Contact Lens and Anterior Eye, 2009, vol. 32, Issue 1, pp. 37-42.
Combined Search and Examination Report issued in corresponding British Patent Application No. 2100525.1 dated Jun. 21, 2021 (8 pages).
International Preliminary Report on Patentability issued in corresponding International Patent Application No. PCT/GB2018/053048 dated Jan. 8, 2020 (15 pages).

CONTACT LENSES HAVING AN ION-IMPERMEABLE PORTION AND RELATED METHODS

This application is a continuation of U.S. patent application Ser. No. 16/164,847 filed Oct. 19, 2018, which in turn claims the benefit under 35 U.S.C. § 119(e) of prior U.S. Provisional Patent Application No. 62/576,945, filed Oct. 25, 2017, and claims priority to United Kingdom Patent Application No. 1803175.7, filed Feb. 27, 2018 and European Patent Application No. 18158967.2, filed Feb. 27, 2018 which are all incorporated in their entireties by reference herein.

FIELD

The present disclosure is directed to contact lenses and related methods, and more specifically to contact lenses that exhibit on-eye movement, and have an ion-impermeable portion, and related methods.

BACKGROUND

It is desirable for soft contact lenses to exhibit a clinically acceptable amount of on-eye movement to avoid binding of a contact lens to the eye. For rigid gas permeable (RGP) contact lenses, this is achieved by the design of the RGP contact lens and how it fits to a person's cornea. For soft contact lenses, namely hydrogel and silicone hydrogel contact lenses, on-eye movement is dependent upon ion diffusion through the contact lens.

Since the development of silicone hydrogel contact lenses, it has been proposed to include electronic components in contact lenses. These electronic components block ion diffusion through the contact lens at the location of the electronic components. Thus, these electronic component-containing contact lenses are prone to having a clinically unacceptable amount of on-eye movement and are prone to binding on the eye.

There remains a need for contact lenses that include one or more electronic components or other ion-impermeable components that exhibit clinically acceptable on-eye movement and do not bind to the eye or eyes of a person.

SUMMARY

The present invention provides new contact lenses and methods to address this need, among others. It has now been determined that contact lenses that include an ion-impermeable portion, such as one or more electronic components, and the like, and an ion-permeable portion, must meet a minimum threshold relationship between an ion diffusion property and a thickness property in order for such contact lenses to exhibit clinically acceptable on-eye movement and not bind to the eye. This relationship is described herein, and is referred to as the average ionoflux transmittance, which is a relationship between the ionoflux diffusion coefficient of a contact lens, and the average thickness of the contact lens.

In one aspect, contact lenses are described. A contact lens according to this aspect includes a lens body that includes an ion-impermeable portion, and an ion-permeable portion.

In some embodiments, the lens body has an average ionoflux transmittance of at least $1.34 \times 10^{-4}$ mm/min. In further embodiments, the lens body has an average ionoflux transmittance from about $1.34 \times 10^{-4}$ mm/min to about $9.0 \times 10^{1}$ mm/min. In yet further embodiments, the lens body has an average ionoflux transmittance from about $1.34 \times 10^{-4}$ mm/min to about $1.50 \times 10^{-1}$ mm/min.

In additional or other embodiments, the lens body has an average thickness of at least 50 micrometers.

In additional or other embodiments, the lens body has an ionoflux diffusion coefficient of at least $6.7 \times 10^{-6}$ mm$^2$/min.

In additional or other embodiments, the lens body has an ion-permeable portion that extends radially inwardly from a lens edge circumscribing the lens body by a distance that is at least 7% of a chord diameter of the lens body.

In additional or other embodiments, the lens body has an average thickness of at least 50 micrometers, an ionoflux diffusion coefficient of at least $6.7 \times 10^{-6}$ mm$^2$/min, and the ion-permeable portion extends radially inwardly from a lens edge circumscribing the lens body by a distance that is at least 7% of a chord diameter of the lens body. As discussed herein, the lens body can be worn on an eye without binding to the eye for a period of at least 6 hours.

In further embodiments, the lens body includes an ion-impermeable portion that includes an electronically adjustable optic that provides a first refractive power without energy, and adjusts to a different second refractive power upon receiving energy, and at least one additional electronic component to provide the energy to the electronically adjustable optic, and the ion-permeable portion includes a hydrogel polymeric material or a silicone hydrogel polymeric material, and the ion-permeable portion is present as an annulus extending radially inwardly from a lens edge circumscribing the lens body by a distance that is at least 7% of a chord diameter of the lens body.

Another aspect of the present invention relates to methods of making the contact lenses described herein. The methods include forming a lens body from at least one lens forming material, wherein the lens body has features described herein for the present contact lenses.

Additional aspects and embodiments of the present contact lenses and methods will be apparent from the following description, drawings, and claims. As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention.

BRIEF DESCRIPTION OF THE DRAWINGS

The other intersecting line represents the properties for a contact lens having an average thickness of 200 micrometers.

DETAILED DESCRIPTION

As described herein, the present invention is based on the realization that in order for a contact lens that includes an ion-impermeable portion (e.g., one or more ion-impermeable components) and an ion-permeable portion (e.g., a hydrogel or silicone hydrogel material) to exhibit clinically acceptable on-eye movement and not bind to the eye, certain properties must be present. Although the exact configuration of the ion-impermeable portion and the ion-permeable portion can vary among different embodiments, it has been found that such contact lenses must meet a minimum threshold in terms of ion diffusion and lens thickness in order to move on the eye. Various embodiments and the relationship of these parameters are described herein.

Figures 1, 2:
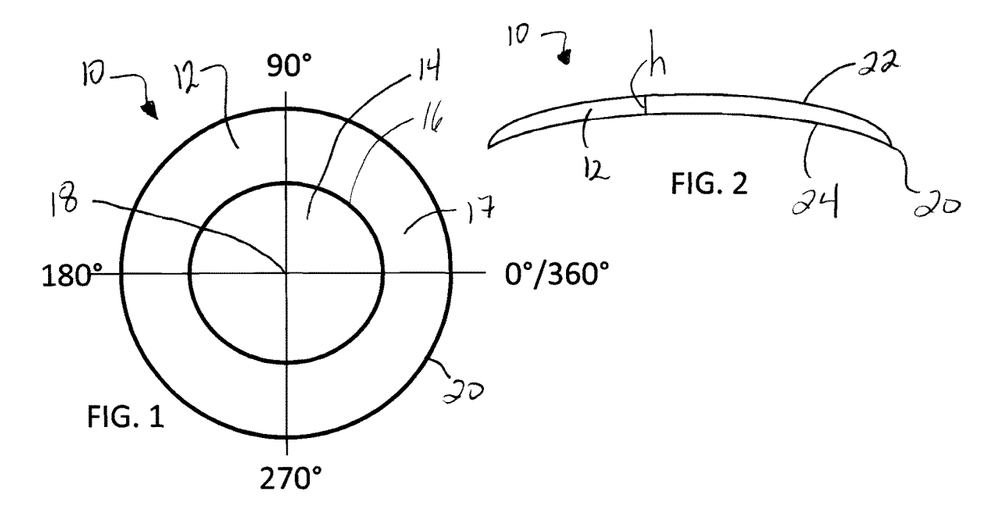
FIG. 1 is a plan view of the anterior surface of a contact lens illustrating four meridians (0 degree, 90 degree, 180 degree, and 270 degree).
FIG. 2 is a cross-sectional view of a contact lens taken through the geometric center of the contact lens.

FIG. 1 illustrates a contact lens 10, which will be further described to provide context for the present contact lenses. Contact lens 10 comprises a lens body 12. As discussed herein, unlike existing contact lenses formed from a single lens formulation, lens body 12 of the contact lenses 10 comprises at least two distinct portions, an ion-impermeable portion, and an ion-permeable portion. Lens body 12 comprises an optic zone 14 circumscribed by an optic zone border 16, which can be visually seen by eye or using an instrument. A peripheral zone 17 circumscribes optic zone border 16, and a lens edge 20 circumscribes peripheral zone 17. The geometric center 18 of the lens body is shown, and typically is also the geometric center of optic zone 14. For purposes of this disclosure, four meridians are illustrated, namely the 0 degree meridian, the 90 degree meridian, the 180 degree meridian, and the 270 degree meridian. As understood by a person of ordinary skill in the art, the 0 degree and the 360 degree meridians are the same.

FIG. 2 illustrates a contact lens 10 that comprises a lens body 12, as shown in FIG. 1. In addition, the lens body comprises an anterior surface 22 and a posterior surface 24. Posterior surface 24 is generally concave in shape, and is shaped to be placed in contact with the tear film of an eye of a person. A thickness "h" is illustrated as the distance between anterior surface 22 and posterior surface 24.

In one aspect, the present invention is directed to contact lenses that include or consist of an ion-impermeable portion and an ion-permeable portion.

As used herein, an ion-impermeable portion refers to a portion of a contact lens body that has no measurable ion diffusion. As understood by persons skilled in the art, ion diffusion of hydrogel and silicone hydrogel contact lenses is quantified by determining the ionoflux diffusion coefficient through a contact lens. A method of determining the ionoflux diffusion coefficient of the present contact lenses is described herein. Thus, it can be understood that the ion-impermeable portion of the contact lens body has an undetectable ionoflux diffusion coefficient using the method and equipment described herein. In comparison, the ion-permeable portion of the contact lens body does have a measurable ionoflux diffusion coefficient using the method and equipment described herein. It can be understood that, as used herein, an ion-permeable portion or an ion-impermeable portion refers to different portions having different material properties, namely different ion-permeabilities. As used herein, a portion does not have a geometric limitation unless specifically stated. We have found that the method and equipment described herein can measure ionoflux diffusion coefficients higher than $5\times10^{-7}$ mm$^2$/min, so a contact lens body or a portion of the contact lens body having an ionoflux diffusion coefficient of less than $5\times10^{-7}$ mm$^2$/min is regarded as being not measurable and hence ion-impermeable. For a contact lens body having a measurable ionoflux diffusion coefficient (i.e. an ionoflux diffusion coefficient of more than $5\times10^{-7}$ mm$^2$/min), the ionoflux diffusion coefficient of the lens body as a whole will depend upon the ionoflux diffusion coefficients of the ion permeable and ion impermeable portions of the lens body and the proportion of the area of the lens body taken up by those portions. It will often be apparent when a portion of the lens body is ion-impermeable; for example, when it includes a metal layer that extends across the whole of the portion and hence prevents any ions from passing through the portion. Where it is not so apparent, the ion permeability or impermeability of a region of the lens can be measured by separately measuring the ionoflux diffusion coefficient of a sample of the materials making up the region and by considering the geometric arrangement of the samples in the region; in other words, the region of the lens will be ion-impermeable if one or more ion-impermeable materials together or separately extend across the whole of the region. Alternatively, if the ionoflux diffusion coefficient of the material(s) forming the permeable portion of the lens body is known or measured separately, the ionoflux diffusion coefficient of another portion can be calculated from the ratio of the areas of the permeable portion and the other portion and a measurement of the ionoflux diffusion coefficient of the whole lens body.

The ion-impermeable portion and the ion-permeable portion together make up the lens body of the contact lens. This is in contrast to existing contact lenses that are formed from a single polymerizable composition resulting in a contact lens having a relatively homogenous polymeric structure in the form of a contact lens, which may or may not be surface treated. In the context of the present description, the ion-impermeable portion can be present in one or more regions of the lens body. Similarly, the ion-permeable portion can be present in one or more regions of the lens body. In embodiments in which the lens body includes multiple ion-permeable regions defining the ion-permeable portion, the ion-permeable regions can be made from the same material, or from different materials. For example, if a lens has a posterior hydrogel component, it may have a hydrogel anterior component or a silicone hydrogel anterior component. In the context of the embodiments described herein, the ion-impermeable portion may include one or more electronic components, one or more silicone elastomer components, or combinations thereof. In the embodiments described in more detail herein, the ion-permeable portion may include one or more hydrogel components or one or more silicone hydrogel components, or combinations thereof. As used herein, "hydrogel" used alone refers to a polymeric material that is free of silicone and has an equilibrium water content (EWC) of at least 10% (wt/wt). In some embodiments, the hydrogel has an EWC from 10% to 90% wt/wt. In further embodiments, the hydrogel has an EWC from 10% to 70% wt/wt. As used herein, "silicone hydrogel" refers to a hydrogel that includes a silicone component, thus a silicone hydrogel also has an EWC of at least 10% (wt/wt). In some embodiments, the silicone hydrogel has an EWC from 10% to 90% wt/wt. In further embodiments, the silicone hydrogel has an EWC from 10% to 70% wt/wt.

Any suitable hydrogel polymeric material or silicone hydrogel polymeric material may be used in the present contact lenses. For example, some common hydrogel and silicone hydrogel materials are known by their US Adopted Names (USANs), such as etafilcon A, ocufilcon A, ocufilcon B, ocufilcon C, ocufilcon D, omafilcon A, omafilcon B, methafilcon A, comfilcon A, enfilcon A, stenfilcon A, fanfilcon A, somofilcon A, riofilcon A, senofilcon A, senofilcon B, senofilcon C, narafilcon A, narafilcon B, and the like. Typically, these hydrogel materials include one or more hydrophilic monomers, such as 2-hydroxyethylmethacrylate (HEMA), n-vinyl pyrrolidone (NVP), dimethylacrylamide (DMA), methacrylic acid (MAA), and the like. Silicone hydrogel materials may include any of these hydrophilic monomers, and may also include one or more polydimethylsiloxanes (PDMSes). The materials may also include crosslinking agents, tinting agents, ultraviolet (UV) light absorbers, and the like.

As used herein, "silicone elastomer" refers to a silicone-containing material, which is also referred to in the art as silicone rubber, and is a material based on polyorganosiloxanes, such as, for example, polydimethylsiloxanes (PDMS). The silicone elastomer component of the present contact lenses may consist of, or consist essentially of, a cured silicone elastomer. For example, the silicone elastomer component may be substantially free of any polymeric component other than the polyorganosiloxanes. As used herein, the silicone elastomer component has a water content less than 1 wt. % based on the total weight of that component. In some examples, the silicone elastomer component has a water content less than 0.5 wt. %, or less than 0.3 wt. %, such as from 0 wt % to 0.9 wt %. Curable formulations for forming the silicone elastomer component include MED 6015, MED 6755 and MED 6033, from NuSil Technology, and SYLGARD elastomers from Dow Corning. The silicone elastomer formulations may be cured in accordance with the manufacturer's recommendations.

The EWC of the lens body or any of the lens forming materials can be measured by wiping off excess surface water from the lens body or the cured form of the lens forming materials and weighing the item to obtain the hydrated weight. The item is dried in an oven at 80° C. under a vacuum, and weighed. The weight difference is determined by subtracting the weight of the dry item from the weight of the hydrated item. The wt. % EWC of item is =(weight difference/hydrated weight)×100.

The ionoflux diffusion coefficient of the present lenses can be determined using routine methods known to persons of ordinary skill in the art. In the context of the present application, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes (for example, from 10 minutes to 120 minutes). The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35 degrees C., measurements of conductivity were taken every 2 minutes for at least 10 minutes, and sometimes, such as when the ionoflux diffusion coefficient values are low, the measurements are taken for a time period of up to about 3 hours or 4 hours. The conductivity increased substantially linearly with time. The conductivity versus time data was used to calculate the ionoflux value (the ionoflux diffusion coefficient) for the lenses tested.

Figure 3:
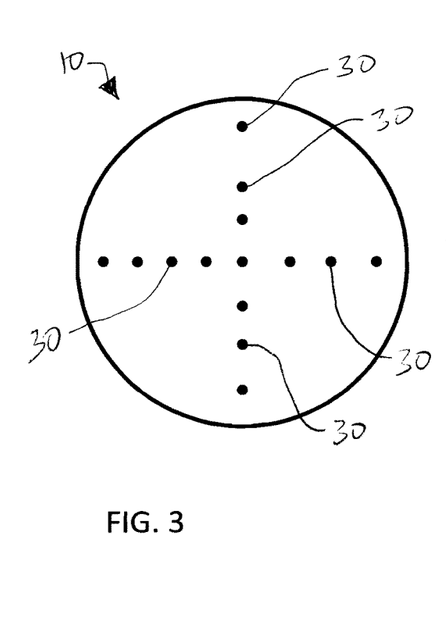
FIG. 3 is a plan view of an anterior surface of a contact lens illustrating multiple sites for measuring the lens thickness along the 0 and 180 degree meridians, and the lens thickness along the 90 and 270 degree meridians.
Figure 4:
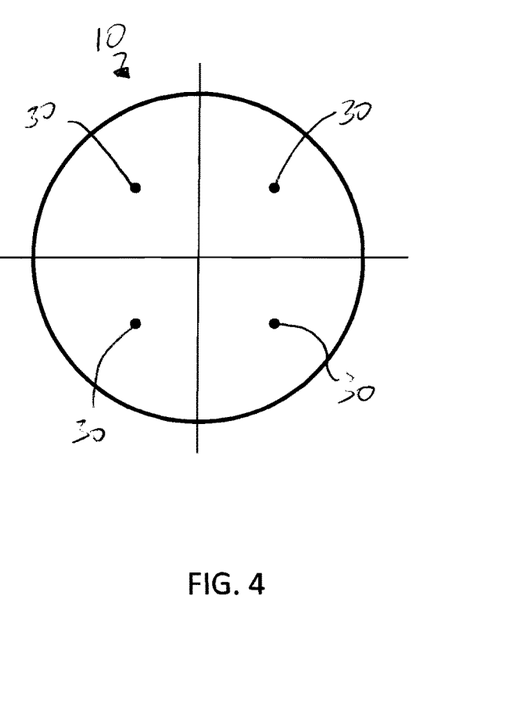
FIG. 4 is a plan view of an anterior surface of a contact lens illustrating four quadrants and each quadrant having a site for measuring the lens thickness.

The thickness of portions or regions of the present contact lenses can be measured using conventional techniques. For example, the thickness can be measured using a Rehder Gauge Model ET-3 electronic thickness gauge or equivalent thickness gauge instrument, including instruments that provide optical measurements of the contact lenses. In embodiments in which the ion-permeable portion of the contact lens body is a hydrogel or silicone hydrogel, it is desirable to measure the thickness in a hydrated state since the hydrogel or silicone hydrogel can swell when hydrated. As used herein, the thickness measurements are reported without any correction, which may be due to mechanical compression as when the Rehder Gauge is used. In the context of the present disclosure, an average thickness of a region of the contact lens or the average thickness of the entire contact lens is determined. The average thickness can be determined using any suitable technique apparent to one of ordinary skill in the art. For example, the thickness of a contact lens is measured at multiple locations across the lens body. The measured thickness values are then summed, and the sum is divided by the number of measurements made to obtain the average thickness. As one example, thickness measurements can be made at multiple points in a straight line from one lens edge to the opposing lens edge, such as along the 0/180 degree meridians or along the 90/270 degree meridians (as shown in FIG. 3, thickness measurement sites are shown by the dots in FIG. 3, some of which are labeled 30). It may be desirable to measure four or more points, and possibly up to about 20 distinct points. In some embodiments, the thickness measurements are made at a number of sites numbering from 4 to 200. As another example, the contact lens may be visually divided into four quadrants defined by the 0 degree, 90 degree, 180 degree, and 270 degree meridians, and at least one thickness measurement can be made in each quadrant (as shown in FIG. 4, where the thickness measurement sites are shown as dots labeled 30). Any suitable number of thickness measurements can be obtained so long as the person doing the measurements believes that the average calculated from the measurements is an accurate depiction of the average thickness of the contact lens or the average thickness of the region of the contact lens. In embodiments disclosed herein, the average thickness is calculated using at least four thickness measurements. In some embodiments, at least eight thickness measurements are obtained. In further embodiments, at least twelve thickness measurements are obtained. In some embodiments, the average thickness is determined by measuring the thickness at a minimum of four locations and up to one hundred locations.

Using the ionoflux diffusion coefficient, as measured above, and the average thickness measurements, as described above, the inventors have calculated the average ionoflux transmittance. Thus, the average ionflux transmittance of a contact lens body is understood to be the ionoflux diffusion coefficient of the contact lens body divided by the average thickness of the contact lens body.

Alternatively, the average ionoflux transmittance of the lens body, which is composed by a number of n different components having different ionoflux diffusion coefficients ($D_{ion}$) and thickness values (h), respectively, can be determined using Formula 1:

$$\frac{\sum_{i=1}^{n} A_i \frac{D_{ion_i}}{h_i}}{\sum_{i=1}^{n} A_i} \quad \text{(Formula 1)}$$

where $$\frac{D_{ion_i}}{h_i}$$

is the ionoflux transmittance (mm/min) of the i-th component, and $A_i$ is the cross-section surface area of the i-th component from plan view.

If Formula 1 is used to determine the average ionoflux transmittance, the ion transport through a component of lens body comprising multiple layers of different materials with different ionoflux diffusion coefficient can be considered as diffusion through the various layers in series, and thus, the effective ionoflux diffusion coefficient $D_{ion_{eff}}$ can be obtained as $$\frac{h_{eff}}{D_{ion_{eff}}} = \sum_{j=1}^{m} \frac{h_j}{D_{ion_j}} \quad \text{(Formula 2)}$$

where $h_{eff}$ is the total thickness of the lens body; m is the total number of layers, $h_j$ and $D_{ion_j}$ are the average thickness and ionoflux diffusion coefficient of the j-th layer, respectively. (If the j-th layer is impermeable, $D_{ion_j}$=0, so $D_{ion_{eff}}$ is also zero.)

Figures 7, 8:
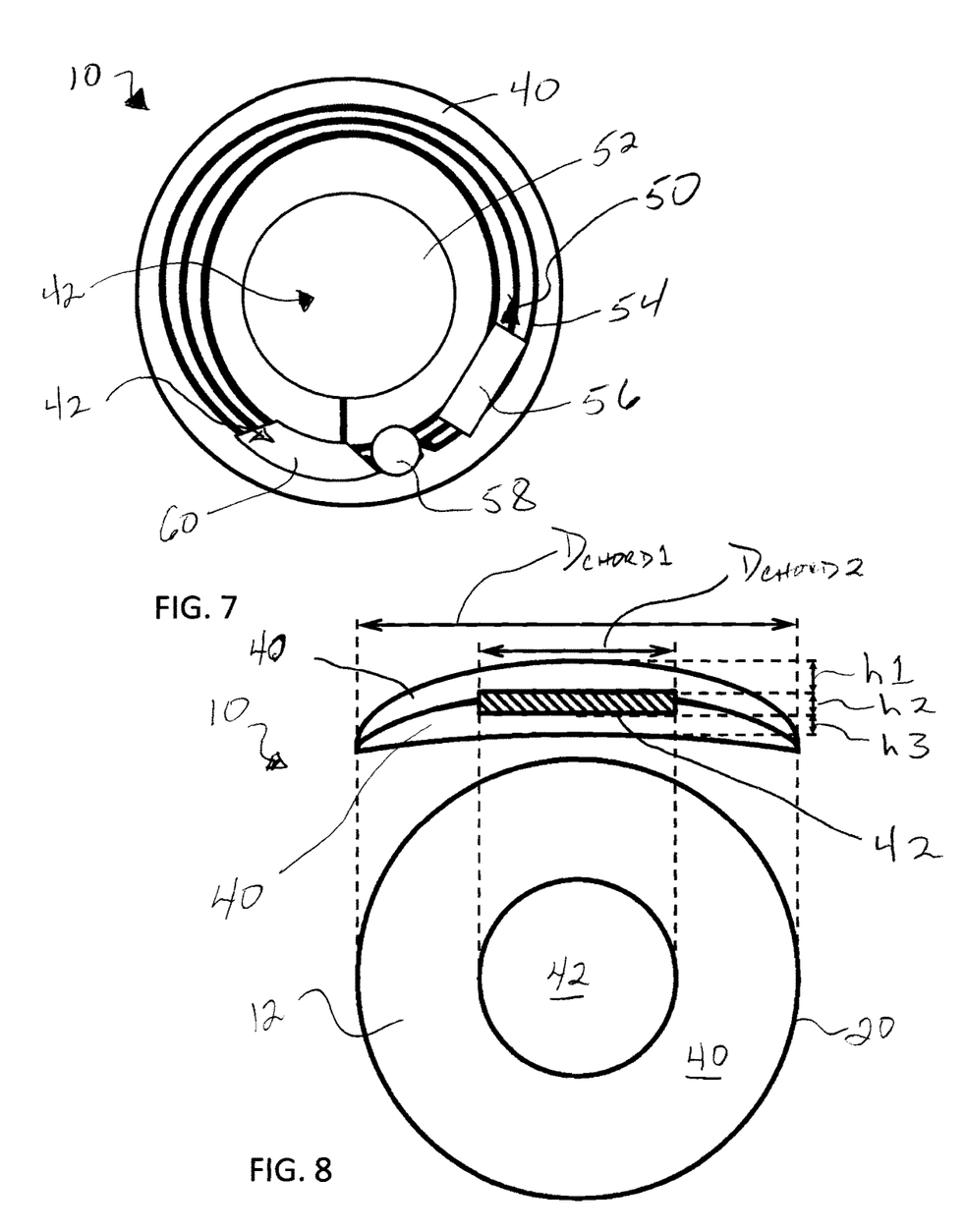
FIG. 7 is a plan view of an illustration of embodiments of the present contact lenses in which the ion-impermeable portion includes at least one electronic component.
FIG. 8 is a plan view and sectional view of an illustration of embodiments of the present contact lenses in which the ion-impermeable portion entrapped between an anterior hydrogel or silicone hydrogel component and a posterior hydrogel or silicone hydrogel component.
Figure 9:
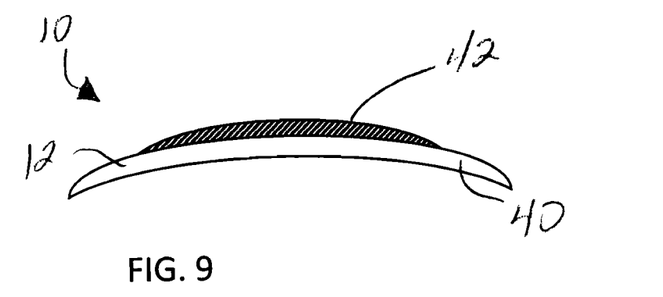
FIG. 9 is a sectional view of an illustration of embodiments of the present contact lenses in which the ion-impermeable portion is located against one surface (e.g., the anterior surface) of a posterior hydrogel component or silicone hydrogel component.

As one example illustrating this function, a lens body may consist of a silicone elastomer disk having a 10 mm diameter, embedded in (for example, see FIG. 8 reference number 42) or on a surface of a hydrogel or silicone hydrogel lens or hydrogel or silicone hydrogel disk having a 14 mm diameter (for example, see FIG. 9 reference number 42). In this example, n=2 because there are two components from plan view; i=1 as the index of the center region of lens body containing the silicone elastomer component; and i=2 as the index of the hydrogel or silicone hydrogel component in the outer region circumscribing the center region. Thus, $D_{ion1}$ is the effective ionoflux diffusion coefficient of the center region containing the ion-impermeable silicone elastomer component, and thus will be zero based on Formula 2, $h_1$ is the average thickness of the center region containing the silicone elastomer component, and $A_1$ is the surface area of the silicone elastomer component in plan view, which is 78.54 mm² in this example. Likewise, $D_{ion2}$ is the ionoflux diffusion coefficient of the hydrogel or silicone hydrogel component, $h_2$ is the thickness of the hydrogel or silicone hydrogel component in the outer region, and $A_2$ is the surface area of the hydrogel or silicone hydrogel component in the outer region in plan view, which is 75.40 mm² in this example. If there are 3 layers in the center region (i.e., a hydrogel or silicone hydrogel posterior layer, a silicone elastomer disk, and a hydrogel or silicone hydrogel anterior layer, as shown in FIG. 8), m=3 in Formula 2 for the center region. Similarly, using the embodiment of FIG. 8, the outer region has 2 layers which are either a hydrogel material or silicone hydrogel material, and therefore, m=2 in Formula 2 for the outer region.

Figure 5:
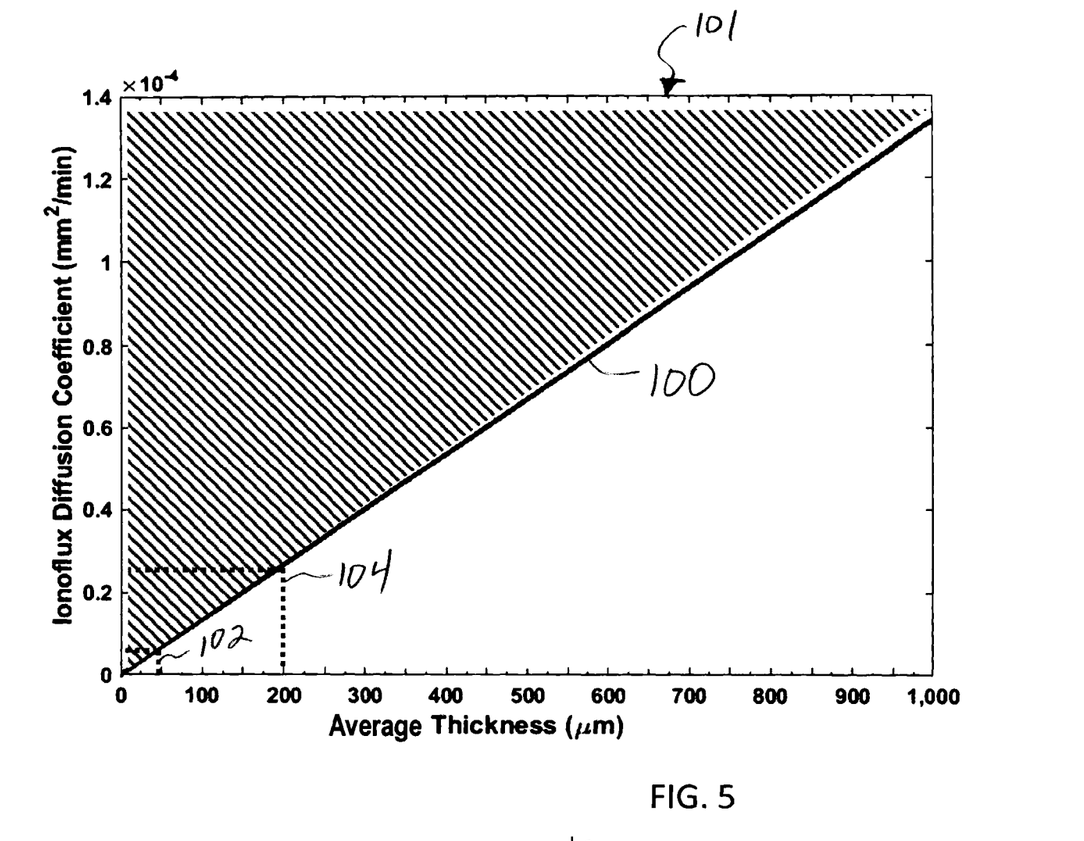
FIG. 5 is a graph illustrating the relationship between the ionoflux diffusion coefficient and average lens thickness, and the average ionoflux transmittance of the present contact lenses. One intersecting line represents the properties for a contact lens having an average thickness of 50 micrometers.

The relationship between the ionoflux diffusion coefficient and average thickness of the present contact lenses is illustrated in the graph of FIG. 5. The straight line 100 represents the minimum average ionoflux transmittance of the present contact lenses, which is 1.34×10⁻⁴ mm/min. The hatched region 101 represents the average ionoflux transmittance values for contact lenses according to the present invention. That is, so long as the lens body includes an ion-impermeable portion and an ion-permeable portion, and has an average ionoflux transmittance of at least 1.34×10⁻⁴ mm/min, the contact lens will demonstrate a clinically acceptable on-eye movement without binding to the eye. An embodiment of a contact lens having an average thickness of 50 micrometers is shown at 102. Another embodiment of a contact lens having an average thickness greater than 200 micrometers is shown at 104. The average thickness of the present contact lenses described herein are typically less than 1000 micrometers. In some embodiments, the average thickness is less than 800 micrometers. In further embodiments, the average thickness is less than 600 micrometers. As an example, the average thickness of any of the embodiments of the contact lenses described herein can be from 50 micrometers to 1000 micrometers. As another example, the average thickness of any of the embodiments of the contact lenses described herein can be from 50 micrometers to 800 micrometers. As another example, the average thickness of any of the embodiments of the contact lenses described herein can be from 50 micrometers to 600 micrometers. As another example, the average thickness of any of the embodiments of the contact lenses described herein can be from 200 micrometers to 1000 micrometers. As another example, the average thickness of any of the embodiments of the contact lenses described herein can be from 200 micrometers to 800 micrometers. As another example, the average thickness of any of the embodiments of the contact lenses described herein can be from 200 micrometers to 600 micrometers.

Accordingly, one embodiment of the present contact lenses is a contact lens that includes a lens body. That lens body includes an ion-impermeable portion and an ion-permeable portion. And, the lens body has an average ionoflux transmittance of at least 1.34×10⁻⁴ mm/min. As stated herein, the average ionoflux transmittance can be calculated by determining the ionoflux diffusion coefficient of the contact lens, and dividing that value by the average thickness of the contact lens.

Figure 6:
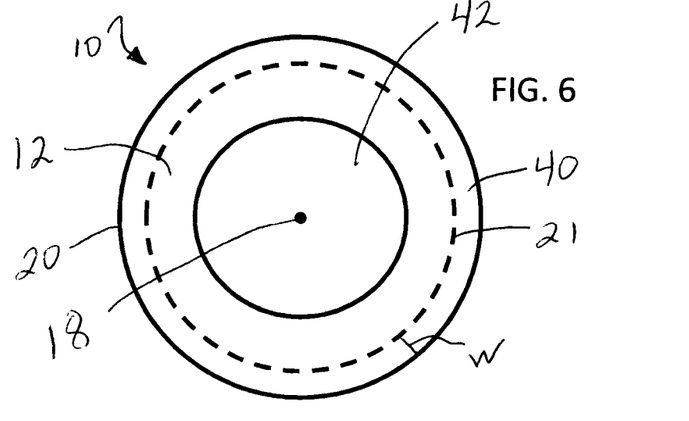
FIG. 6 is a plan view of an anterior surface of a contact lens illustrating the geometric center and an annular ion-impermeable portion.

As an example, such a contact lens is illustrated in FIG. 6. Contact lens 10 comprises lens body 12, which comprises an ion-impermeable portion 42 and an ion-permeable portion 40. In this contact lens, the lens body has an average ionoflux transmittance of at least $1.34\times10^{-4}$ mm/min.

As used herein, the lens body of the contact lens refers to the lens that is placed on the tear film of the eye of a person. Thus, the lens body can be understood to have an anterior surface, and a posterior surface that is shaped for placement on a cornea of the eye, as described for FIG. 2. The anterior surface is typically generally convex in shape, and the posterior surface is typically generally concave in shape. The anterior and posterior surfaces come together at the lens edge. The lens edge can be understood to be the radially outermost point of the contact lens body from the geometric center of the lens body. The lens edge circumscribes the lens body.

In another embodiment, the ion-permeable portion is present at a region of the lens body that extends at least 1.1 mm from the lens edge towards the geometric center of the lens body. For example, as shown in FIG. 6, ion-permeable portion 40 is shown at a location extending from lens edge 20 radially inwardly towards geometric center 18. Dotted line 21 is provided to illustrate a distance of at least 1.1 mm (for a contact lens having a chord diameter of at least 14.2 mm). The width "w" of ion-permeable portion 40 is illustrated as extending from lens edge 20 to dotted line 21. In other words, it can be visualized that in this embodiment, the ion-permeable portion is provided as a ring or annulus extending from the lens edge toward the center of the lens body and having a radial width of at least 1.1 mm. In some embodiments, the radial width of the ion-permeable portion is from 1.1 mm to 4.6 mm. In some further embodiments, the radial width of the ion-permeable portion is from 1.1 mm to 3.5 mm. In these embodiments, the ion-permeable portion may also be provided at other regions of the lens body, but at a minimum, it is present as a 1.1 mm wide ring around the lens body. For example, the ion-permeable portion may also form the posterior surface of the lens body, the anterior surface of the lens body, or fractions thereof. As discussed herein, the ion-permeable portion, such as a hydrogel or silicone hydrogel material, may be provided as a posterior layer, and the ion-impermeable portion, such as a silicone elastomer material, may be provided as an anterior layer in contact with the posterior layer. Alternatively, the ion-permeable portion, such as a hydrogel or silicone hydrogel material, may be provided as an anterior layer, and the ion-impermeable portion, such as a silicone elastomer material, may be provided as posterior layer in contact with the anterior layer. In addition, the ion-permeable portion and/or the ion-impermeable portion may consist of non-contiguous regions. For example, the ion-permeable portion may be integrated between ion-impermeable components of the ion-impermeable portion that may be embedded within the ion-permeable portion. For example, a hydrogel or silicone hydrogel material may be provided between two electronic components that are embedded within the hydrogel or silicone hydrogel material. Furthermore, the annulus of the ion-permeable portion 40 may have a width "w" that is at least 1.1 mm. For example, width "w" may be a value from 1.1 mm to 3.2 mm. In some embodiments, the radial width of the ion-permeable portion is from 1.1 mm to 4.6 mm. In some further embodiments, the radial width of the ion-permeable portion is from 1.1 mm to 3.5 mm.

In an additional embodiment of the contact lenses that have an average ionoflux transmittance of at least $1.34\times10^{-4}$ mm/min, the lens body has an average thickness and an ionoflux diffusion coefficient, as determined using the method described herein, in which the average thickness of the lens body is at least fifty micrometers and the ionoflux diffusion coefficient is at least $6.7\times10^{-6}$ mm$^2$/min. An example of such a contact lens is identified at 102 in FIG. 5. In some embodiments of these contact lenses, the ionoflux diffusion coefficient is from $6.7\times10^{-6}$ mm$^2$/min to $9.0\times10^{-2}$ mm$^2$/min. In further embodiments, the ionoflux diffusion coefficient is from $6.7\times10^{-6}$ mm$^2$/min to $8.9\times10^{-2}$ mm$^2$/min.

In another embodiment of the contact lenses, a contact lens includes a lens body that includes an ion-impermeable portion, and an ion-permeable portion, and the lens body has an average thickness of at least 50 micrometers, and a calculated ionoflux diffusion coefficient of at least $6.7\times10^{-6}$ mm$^2$/min, and the ion-permeable portion extends radially inwardly from a lens edge circumscribing the lens body by a distance that is at least 7% of a chord diameter of the lens body. For example, in some embodiments, the ion-permeable portion may extend radially inwardly from the lens edge by a distance that is between 7% and 35% of the chord diameter of the lens body. In further embodiments, the radial distance may be between 7% and 25% of the chord diameter of the lens body. As described herein, this embodiment of the contact lens can be worn on-eye for at least 6 hours (for example, from 6 hours to 24 hours) without binding to the eye. For example, the contact lens when worn for a 6 hour study exhibits clinically acceptable on-eye movement, as evident by an on-eye movement rate of 0.1 mm/second to 4 mm/second. In some embodiments of these contact lenses, the ionoflux diffusion coefficient is from $6.7\times10^{-6}$ mm$^2$/min to $9.0\times10^{-2}$ mm$^2$/min. In further embodiments, the ionoflux diffusion coefficient is from $6.7\times10^{-6}$ mm$^2$/min to $8.9\times10^{-2}$ mm$^2$/min.

As understood by persons of ordinary skill in the art, typically, contact lenses are illustrated in plan view (as shown in the accompanying figures) and the diameter of the contact lens corresponds to the chord diameter. The chord diameter of the present contact lenses can range from 12 mm to 17 mm. In some embodiments, the chord diameter of the present contact lenses is from 13.5 mm to 14.5 mm. For example, the chord diameter of the present contact lenses may be about 14.0 mm, 14.1 mm, 14.2 mm, 14.3 mm, and the like. In these embodiments, if a contact lens has a chord diameter of 12.0 mm, the ion-permeable portion extends from the lens edge by at least 0.84 mm. Similarly, if a contact lens body has a chord diameter of 15 mm, the ion-permeable portion extends from the lens edge by at least 1.05 mm.

In a further embodiment, the ion-permeable portion of the lens body extends at least 1.1 mm from the lens edge towards the geometric center. It has been found that when contact lenses are made to have an ion-permeable portion that extends at least 1.1 mm from the lens edge toward the geometric center, it is possible to maintain an average ionoflux transmittance of at least $1.34\times10^{-4}$ mm/min, and to avoid binding of the contact lens to the eye of a person (e.g., the contact lens demonstrates clinically acceptable on-eye movement). In some embodiments, the radial width of the ion-permeable portion is from 1.1 mm to 4.6 mm. In some further embodiments, the radial width of the ion-permeable portion is from 1.1 mm to 3.5 mm.

As stated above, in some embodiments, including the illustrated embodiments, the ion-permeable portion defines an annulus having a radially outer edge defined by the lens edge of the lens body.

In any of the foregoing embodiments of contact lenses, the ion-impermeable portion may constitute less than 75% of the area of the lens body when viewed in plan view. Thus, it can be understood that the ion-impermeable portion may have an area that is from 1% to 74% of the area of the lens body when viewed in plan view. In some embodiments, the ion-impermeable portion constitutes no more than 70% of the area of the lens body. That is, the ion-impermeable portion may occupy 70% or less of the area of the lens body. For example, the ion-impermeable portion may have an area that is from 1% to 70% of the area of the lens body. It has been found that by controlling the dimensions and shape of the ion-impermeable portion to be confined to a region that is less than 75% of the area of the lens body, such as 70% or less, it is possible to maintain the desired average ionoflux transmittance to achieve clinically acceptable on-eye movement.

In any of the foregoing embodiments, and as alluded to herein, the ion-impermeable portion may comprise at least one electronic component. As used herein, an "electronic component" refers to a device or devices that can control or direct electric current. These electronic components may be used to cause a change in the contact lens, such as a change in the refractive power of the contact lens, or a change in visual image provided by the contact lens, among other things. In some embodiments, the at least one electronic component can be at least one electrode, at least one power supply, at least one sensor, or at least one transmitter, or combinations thereof.

In any of the foregoing embodiments, the lens body can comprise an optic zone that includes an electronically adjustable optic. The optic zone of the contact lens corresponds to the region of the contact lens that overlays the pupil of an eye when the contact lens is located on the eye. Typically, the geometric center of the optic zone is the same as the geometric center of the contact lens body. The optic zone can have a diameter from about 5 mm to about 9 mm. In some embodiments, the optic zone has a diameter from 5 mm to 8.5 mm long. Thus, in these embodiments, an electronically adjustable optic can be provided in the optic zone, and can change in refractive power based on electrical activity provided to the electronically adjustable optic. In some embodiments, the electronically adjustable optic comprises a liquid crystal component. In such an embodiment, the liquid crystal-based optic can be located between an anterior ion-permeable component and a posterior ion-permeable component, such as illustrated in FIG. 8, and described below. In other embodiments, the electronically adjustable optic comprises a fluid filled membrane component. In such an embodiment, the fluid filled membrane-based optic can be located on an anterior surface of a posterior ion-permeable component, such as illustrated in FIG. 9, and described below. In these embodiments, an electric current can be passed to the liquid crystal component or the fluid filled membrane component and cause the refractive power provided by the optic to change from a first refractive power to a second different refractive power.

An example of a contact lens 10 comprising a lens body that includes an ion-impermeable portion 42 and an ion-permeable portion 40, wherein the ion-impermeable portion 42 comprises one or more electronic components 50 is illustrated in FIG. 7. In this embodiment, the electronic components 50 include an electronically adjustable optic 52, one or more electrodes 54, at least one power supply 56, at least one sensor 58, and at least one transmitter 60. Some embodiments may have fewer than five electronic components, if desired.

Any of the electronic components 50 of the present contact lenses, may be coated with an ion-permeable or ion-impermeable material, if desired. For example, one or more of the electronic components may be coated with a parylene material or an ion-impermeable material, including possibly, a silicone elastomer material, or a material to facilitate attachment between the electronic component and the lens body. The coatings can be any suitable thickness so long as the relationship between the ion-impermeable portion of the lens body and the ion-permeable portion of the lens body are maintained in accordance with the present disclosure.

As discussed herein, in any of the foregoing embodiments, the lens body may comprise a hydrogel component, a silicone hydrogel component, or a silicone elastomer component, or combinations thereof. It can be understood that the hydrogel component or the silicone hydrogel component would form the ion-permeable portion of the contact lens body, and that the silicone elastomer component would form the ion-impermeable portion of the contact lens body. The silicone elastomer component and the electronic component or electronic components may also form the ion-impermeable portion of the contact lens body.

In any of the foregoing embodiments, the ion-impermeable portion can have a substantially circular shape when viewed in plan view, and it can have a diameter of 12 mm or less. For example, the diameter of the ion-impermeable portion can be from 5 mm to 12 mm. In some embodiments, the diameter of the ion-impermeable portion can be from 7 mm to 12 mm. This would include an ion-impermeable portion which is shaped as a circular or hemispherical disk, and has a diameter no greater than 12 mm, or it could include a ring electrode component having an outer diameter no greater than 12 mm, and one or more additional components that are located radially inward relative to the ring electrode.

In view of the disclosure herein, it can be appreciated that another embodiment of the present contact lenses can be understood to comprise a lens body that comprises an ion-impermeable portion, and an ion-permeable portion, and the ion-impermeable portion comprises an electronically adjustable optic that provides a first refractive power without energy, and adjusts to a different second refractive power upon receiving energy, and at least one additional electronic component to provide the energy to the electronically adjustable optic, and the ion-permeable portion comprises a hydrogel polymeric or silicone hydrogel polymeric material, and the ion-permeable portion is present as an annulus extending radially inwardly from a lens edge circumscribing the lens body by a distance that is at least 7% of a chord diameter of the lens body. In some embodiments, the ion-permeable portion may extend radially inwardly from the lens edge by a distance that is between 7% and 35% of the chord diameter of the lens body. In further embodiments, the radial distance may be between 7% and 25% of the chord diameter of the lens body.

In this embodiment, the electronically adjustable optic may comprise a liquid crystal component or a fluid filled membrane component. In addition, or alternatively, the annulus of the ion-permeable portion may have a radial width of at least 1.1 mm from the lens edge. In some embodiments, the radial width of the ion-permeable portion is from 1.1 mm to 4.6 mm. In some further embodiments, the radial width of the ion-permeable portion is from 1.1 mm to 3.5 mm. Further, any of these embodiments may have an average ionoflux transmittance of at least $1.34 \times 10^{-4}$ mm/min. And, in any of these embodiments, the ion-impermeable portion may further comprise a silicone elastomer material.

In any of the foregoing embodiments, the lens body comprises an ion-impermeable portion, and an ion-permeable portion, and the lens body has an average thickness of at least 200 micrometers, and an ionoflux diffusion coefficient of at least $2.68 \times 10^{-5}$ mm$^2$/min. For example, the ionoflux diffusion coefficient is from $2.68 \times 10^{-5}$ mm$^2$/min to $9.0 \times 10^{-2}$ mm$^2$/min, or the ionoflux diffusion coefficient is from $2.68 \times 10^{-5}$ mm$^2$/min to $8.9 \times 10^{-2}$ mm$^2$/min.

In some additional embodiments, the lens body comprises an ion-impermeable portion, and an ion-permeable portion, and the lens body has an average thickness of at least 201 micrometers, and an ionoflux diffusion coefficient of at least $2.693 \times 10^{-5}$ mm$^2$/min. As an example, see 104 of FIG. 5. For example, the ionoflux diffusion coefficient is from $2.693 \times 10^{-5}$ mm$^2$/min to $9.0 \times 10^{-2}$ mm$^2$/min, or the ionoflux diffusion coefficient is from $2.693 \times 10^{-5}$ mm$^2$/min to $8.9 \times 10^{-2}$ mm$^2$/min.

In some further embodiments of the present contact lenses, the contact lenses comprising the ion-impermeable portion and an ion-permeable portion have a center thickness greater than 200 micrometers.

As mentioned herein, any of the foregoing embodiments may comprise a lens body that exhibits an on-eye movement rate from 0.1 mm/second to 4.0 mm/second.

In accordance with another aspect of the invention, methods of making the contact lenses described herein are provided. The methods comprise a step of forming a lens body from at least one lens forming materials, wherein the lens body comprises an ion-impermeable portion and an ion-permeable portion. The resulting lens body has any of the features of the present contact lenses described herein. For example, in some embodiments, the lens body has an average ionoflux transmittance of at least $1.34 \times 10^{-4}$ mm/min. In other embodiments, the lens body has an average thickness of at least 50 micrometers, an ionoflux diffusion coefficient of at least $6.7 \times 10^{-6}$ mm$^2$/min, and the ion-permeable portion extends radially inwardly from a lens edge circumscribing the lens body by a distance that is at least 7% of a chord diameter of the lens body. For example, in some embodiments, the ion-permeable portion may extend radially inwardly from the lens edge by a distance that is between 7% and 35% of the chord diameter of the lens body. In further embodiments, the radial distance may be between 7% and 25% of the chord diameter of the lens body. In some embodiments of these contact lenses, the ionoflux diffusion coefficient is from $6.7 \times 10^{-6}$ mm$^2$/min to $9.0 \times 10^{-2}$ mm$^2$/min. In further embodiments, the ionoflux diffusion coefficient is from $6.7 \times 10^{-6}$ mm$^2$/min to $8.9 \times 10^{-6}$ mm$^2$/min. In yet further embodiments, the ion-impermeable portion comprises an electronically adjustable optic that provides a first refractive power without energy, and adjusts to a different second refractive power upon receiving energy, and at least one additional electronic component to provide the energy to the electronically adjustable optic, and the ion-permeable portion comprises a hydrogel polymeric material or silicone hydrogel polymeric material, and the ion-permeable portion is present as an annulus extending radially inwardly from a lens edge circumscribing the lens body by a distance that is at least 7% of a chord diameter of the lens body. In some embodiments, the ion-permeable portion may extend radially inwardly from the lens edge by a distance that is between 7% and 35% of the chord diameter of the lens body. In further embodiments, the radial distance may be between 7% and 25% of the chord diameter of the lens body.

As one example, the lens bodies of the present contact lenses can be formed by cast molding processes, spin cast molding processes, or lathing processes, or a combination thereof. As understood by persons skilled in the art, cast molding refers to the molding of a contact lens by placing a lens forming material between a female mold member having a concave lens forming surface, and a male mold member having a convex lens forming surface. In addition, the forming of the lens bodies can include coupling together two cast molded components. One of the cast molded components is a hydrogel polymeric material or a silicone hydrogel polymeric material, and the other cast molded component can be a hydrogel polymeric material or a silicone hydrogel polymeric material, or even a silicone elastomer material. The coupling can be achieved using an adhesive, or curing the components together, and the like. The lens body can even be surface treated, if desired, so long as the surface treatment material does not decrease the ionoflux diffusion coefficient or the average ionoflux transmittance below the threshold values described herein.

After the lens forming material, which includes the ion-permeable material and the ion-impermeable materials or components, is placed in a contact lens mold assembly formed from the male and female mold members, the contact lens is cured to form the lens body. The lens body can then be removed from the mold assembly, and optionally washed with or without organic solvents, water, or combinations thereof, and packaged in a contact lens package. The contact lens package is then sealed and sterilized using conventional techniques.

In some embodiments, the lens body comprises a posterior member that is formed from a hydrogel or silicone hydrogel polymeric material, and an anterior member that is formed from a hydrogel or silicone hydrogel polymeric material. A silicone elastomer member, or one or more electronic components, or a combination thereof, can be placed on a posterior surface of the anterior member, and the anterior surface of the posterior member can be placed in contact with the anterior member to sandwich the silicone elastomer member, or the electronic components, or both, between the anterior member and the posterior member. The resulting "sandwich" assembly can be understood to be a lens body in the context of the present disclosure.

An example of such a lens body is illustrated in FIG. 8. Contact lens 10 includes lens body 12, as described herein. Lens body 12 comprises ion-impermeable portion 42 and ion-permeable portion 40. The chord diameter of lens body 12 is labeled as $D_{chord1}$, and the chord diameter of the impermeable portion 42 is labeled as $D_{chord2}$. The thickness of the anterior ion-permeable component 40 is labeled "h1", the thickness of the posterior ion-permeable component 40 is labeled "h3", and the thickness of the ion-impermeable component 42 is labeled "h2". In this embodiment, the ion-impermeable portion is entrapped between the anterior and posterior ion-permeable components.

As another example, as shown in FIG. 9, an ion-impermeable portion 42 can be provided on one surface (in this case, the anterior surface) of the ion-permeable portion 40. The combination of the ion-impermeable portion 42 and the ion-permeable portion 40 define the lens body 12 of the contact lens 10.

In the embodiment illustrated in FIG. 8, the ion-impermeable portion 42 can be an electronically adjustable optic, such as a liquid crystal optic. In the embodiment illustrated in FIG. 9, the ion-impermeable portion 42 can be an electronically adjustable optic, such as a fluid-filled membrane optic. For example, a membrane optic may include two elastic or deformable membranes, at least one of which is made from a silicone elastomer material, and an optically clear fluid may be present between the membranes. In this example, the posterior membrane would be adjacent the anterior surface of the ion-permeable portion.

Alternatively, the ion-impermeable components can be placed in the cavity of a female mold member, and the ion-permeable material can be placed in the cavity so as to surround the ion-impermeable components and trap the ion-impermeable components within the lens body after the lens body has been cured or polymerized.

The present contact lenses exhibit clinically acceptable on-eye movement, and have not shown binding to a person's eye. Clinically acceptable on-eye movement of the present contact lenses can be determined by slit lamp evaluation using a standard push-up test. In one example, a contact lens can be pushed up by a person's finger by about 1-5 mm and it has a push-up recovery speed of from 0.1 mm/s to 4 mm/s, as determined using the method described by Wolffsohn et al (Cont. Lens Anterior Eye. (2009) 32:37-42). This push-up recovery speed can be understood to be a rate of on-eye movement, as used herein. Thus, the present contact lenses can be used by placing them on an eye and evaluating the movement on the eye for a period of time, such as at multiple time periods, for example, once every hour for about six hours or so. When the present contact lenses include an electronically adjustable optic, the contact lenses can be used to correct vision of contact lens wearers who may benefit by having multiple refractive powers. For example, the present contact lenses may be useful in correcting presbyopia by providing a base refractive power, and then when the electronically adjustable optic is activated, the refractive power can change and become relatively more positive to facilitate intermediate or near viewing. The optic can then be deactivated to return to the base refractive power.

EXAMPLES

Examples of contact lenses in accordance with the present disclosure are described below. Contact lenses were tested on eyes of subjects for a period of time up to and including 6 hours. The contact lenses were evaluated for on-eye movement using a push-up test, as described herein. For the purposes of these experiments, the contact lenses consisted of a combination of a silicone elastomer component and a hydrogel component or a silicone hydrogel component. The silicone elastomer component was provided as an example of the ion-impermeable portion of the contact lens, and the hydrogel component or the silicone hydrogel component was provided as an example of the ion-permeable portion of the contact lens. The hydrogel or silicone hydrogel component was provided as a posterior component, so that the posterior surface of the hydrogel or silicone hydrogel component contacted the surface of the eye. A silicone elastomer component was located on the anterior surface of the posterior component. In some examples, an additional hydrogel or silicone hydrogel component was located anterior (e.g., on top of) the silicone elastomer component (e.g., the silicone elastomer component was embedded between the anterior and posterior components, which are hydrogel materials or silicone hydrogel materials). The silicone elastomer component did not have a detectable ionoflux diffusion coefficient (i.e., it was ion-impermeable, as used herein), and is identified as having an ionoflux diffusion coefficient of 0.

Example 1

A contact lens was formed consisting of an ion-permeable posterior component and an ion-impermeable anterior component. The posterior component was a silicone hydrogel, and the anterior component was a silicone elastomer. The silicone elastomer anterior component had a chord diameter of 14.2 mm; and the silicone hydrogel posterior component had a chord diameter of 14.2 mm. The average thickness of the contact lens was about 470 micrometers. The ionoflux diffusion coefficient was 0 for the silicone elastomer anterior component and was $5034 \times 10^{-6}$ mm$^2$/min for the silicone hydrogel posterior component. The average ionoflux transmittance was determined to be 0 mm/min. The relative area of the contact lens with zero ionoflux was 100% (the area of the ion-impermeable anterior component was equal to the area of the ion-permeable posterior component, when viewed in plan view). This contact lens bound to the eye, and did not exhibit on-eye movement after 6 hours of wear.

Example 2

A contact lens was formed consisting of an ion-permeable posterior component, an ion-permeable anterior component, and an ion-impermeable component located between the anterior component and the posterior component (e.g., the ion-impermeable component was entrapped between the ion-permeable anterior component and ion-permeable posterior component, see FIG. 8 for example). The posterior component was a hydrogel, the anterior component was a silicone hydrogel, and the ion-impermeable component was a silicone elastomer. The silicone elastomer component had a chord diameter of 7.8 mm; the hydrogel posterior component had a chord diameter of 14.2 mm; and the silicone hydrogel anterior component had a chord diameter of 14.2 mm. The average thickness of the contact lens in the outer region (identified with reference numeral 40) was 635 micrometers and the average thickness in the center region (identified with reference numeral 42) was 988 micrometers. The ionoflux diffusion coefficient was 0 for the silicone elastomer component, $7500 \times 10^{-6}$ mm$^2$/min for the hydrogel posterior component, and $47 \times 10^{-6}$ mm$^2$/min for the silicone hydrogel anterior component. The average ionoflux transmittance was determined to be $1.81 \times 10^{-4}$ mm/min. The relative area of the contact lens with zero ionoflux was 30.2% (the area of the ion-impermeable component was less than the area of the ion-permeable component (e.g., the combination of the anterior and posterior component), when viewed in plan view). This contact lens did not bind to the eye, and exhibited clinically acceptable on-eye movement after 6 hours of wear.

Example 3

A contact lens was formed consisting of an ion-permeable posterior component, an ion-permeable anterior component, and an ion-impermeable component located between the anterior component and the posterior component (e.g., the ion-impermeable component was entrapped between the ion-permeable anterior component and ion-permeable posterior component). The posterior component was a hydrogel, the anterior component was a silicone hydrogel, and the ion-impermeable component was a silicone elastomer. The silicone elastomer component had a chord diameter of 10 mm; the hydrogel posterior component had a chord diameter of 14.2 mm; and the silicone hydrogel anterior component had a chord diameter of 14.2 mm. The average thickness of the contact lens in the outer region (reference numeral 40 of FIG. 8, for example) was 635 micrometers and in the center region was 988 micrometers (reference numeral 42 of FIG. 8, for example). The ionoflux diffusion coefficient was 0 for the silicone elastomer component, $7500 \times 10^{-6}$ mm$^2$/min for the hydrogel posterior component, and $47 \times 10^{-6}$ mm$^2$/min for the silicone hydrogel anterior component. The average ionoflux transmittance was determined to be $1.34 \times 10^{-4}$ mm/min. The relative area of the contact lens with zero ionoflux was 49.6% (the area of the ion-impermeable component was less than the area of the ion-permeable component (e.g., the combination of the anterior and posterior component), when viewed in plan view). This contact lens did not bind to the eye, and exhibited clinically acceptable on-eye movement after 6 hours of wear.

Example 4

A contact lens was formed consisting of an ion-permeable posterior component, an ion-permeable anterior component, and an ion-impermeable component located between the anterior component and the posterior component (e.g, the ion-impermeable component was entrapped between the ion-permeable anterior component and ion-permeable posterior component). The posterior component was a hydrogel, the anterior component was a hydrogel, and the ion-impermeable component was a silicone elastomer. The silicone elastomer component had a chord diameter of 12.0 mm; the hydrogel posterior component had a chord diameter of 14.2 mm; and the hydrogel anterior component had a chord diameter of 14.2 mm. The average thickness of the contact lens in the outer region (reference numeral 40 of FIG. 8, for example) was 646 micrometers and in the center region was 988 micrometers (reference numeral 42 of FIG. 8, for example). The ionoflux diffusion coefficient was 0 for the silicone elastomer component, $7500 \times 10^{-6}$ mm$^2$/min for the hydrogel posterior component, and $15370 \times 10^{-6}$ mm$^2$/min for the hydrogel anterior component. The average ionoflux transmittance was determined to be $3.92 \times 10^{-3}$ mm/min. The relative area of the contact lens with zero ionoflux was 71.4% (the area of the ion-impermeable component was less than the area of the ion-permeable component (e.g., the combination of the anterior and posterior component), when viewed in plan view). This contact lens did not bind to the eye, and exhibited clinically acceptable on-eye movement after 6 hours of wear.

Additional aspects of the present invention can be envisioned as set forth in the following clauses:

1. A contact lens, comprising:
a lens body that comprises an ion-impermeable portion, and an ion-permeable portion, the lens body having an average ionoflux transmittance of at least $1.34 \times 10^{-4}$ mm/min.
2. The contact lens of clause 1, wherein the lens body further comprises an anterior surface, a posterior surface shaped for placement on a cornea of an eye, a lens edge circumscribing the lens body, and the ion-permeable portion is present at a region of the lens body extending at least 1.1 mm from the lens edge towards the geometric center of the lens body.
3. The contact lens of any preceding clause, wherein the lens body has an average thickness and an ionoflux diffusion coefficient, wherein the average thickness is at least 50 micrometers and the ionoflux diffusion coefficient is at least $6.7 \times 10^{-6}$ mm$^2$/min.
4. A contact lens, comprising:
a lens body that comprises an ion-impermeable portion, and an ion-permeable portion, the lens body having an average thickness of at least 50 micrometers, an ionoflux diffusion coefficient of at least $6.7 \times 10^{-6}$ mm$^2$/min, and the ion-permeable portion extends radially inwardly from a lens edge circumscribing the lens body by a distance that is at least 7% of a chord diameter of the lens body, wherein the lens body can be worn for at least six hours without binding to the eye.
5. The contact lens of clause 4, wherein the ion-permeable portion extends at least 1.1 mm from the lens edge towards the geometric center.
6. The contact lens of any one of clauses 2, 4, or 5, wherein the ion-permeable portion defines an annulus having a radially outer edge defined by the lens edge of the lens body.
7. The contact lens of any preceding clause, wherein the ion-impermeable portion constitutes less than 75% of the area of the lens body when viewed in plan view.
8. The contact lens of clause 7, wherein the ion-impermeable portion constitutes no more than 70% of the area of the lens body.
9. The contact lens of any preceding clause, wherein the ion-impermeable portion comprises at least one electronic component.
10. The contact lens of clause 9, wherein the at least one electronic component comprises at least one electrode, at least one power supply, at least one sensor, or at least one transmitter, or combinations thereof.
11. The contact lens of any preceding clause, wherein the lens body comprises an optic zone that comprises an electronically adjustable optic.
12. The contact lens of clause 11, wherein the electronically adjustable optic comprises a liquid crystal component, or a fluid filled membrane component.
13. The contact lens of any preceding clause, wherein the lens body comprises a hydrogel component, a silicone hydrogel component, or a silicone elastomer component, or combinations thereof.
14. The contact lens of any preceding clause, wherein the ion-impermeable portion has a substantially circular shape when viewed in plan view, and the ion-impermeable portion has a diameter no greater than 12 mm.
15. A contact lens, comprising:
a lens body that comprises an ion-impermeable portion, and an ion-permeable portion,
wherein the ion-impermeable portion comprises an electronically adjustable optic that provides a first refractive power without energy, and adjusts to a different second refractive power upon receiving energy, and at least one additional electronic component to provide the energy to the electronically adjustable optic, and
wherein the ion-permeable portion comprises a hydrogel polymeric material or a silicone hydrogel polymeric material, and the ion-permeable portion is present as an annulus extending radially inwardly from a lens edge circumscribing the lens body by a distance that is at least 7% of a chord diameter of the lens body.
16. The contact lens of clause 15, wherein the electronically adjustable optic comprises a liquid crystal component, or a fluid filled membrane component.
17. The contact lens of any one of clauses 15 to 16, wherein the annulus of the ion-permeable portion has a radial width of at least 1.1 mm from the lens edge.
18. The contact lens of any one of clauses 15 to 17, wherein the lens body has an average ionoflux transmittance of at least $1.34 \times 10^{-4}$ mm/min.
19. The contact lens of any one of clauses 15 to 18, wherein the ion-impermeable portion further comprises a silicone elastomer material.
20. A contact lens, comprising:
a lens body that comprises an ion-impermeable portion, and an ion-permeable portion, the lens body having an average thickness of at least 200 micrometers, and an ionoflux diffusion coefficient of at least $2.68\times10^{-5}$ mm²/min.

21. The contact lens of clause 20, wherein the lens body exhibits an on-eye movement rate from 0.1 mm/second to 4.0 mm/second.

22. The contact lens of clause 20 or 21, wherein the lens body has an average ionoflux transmittance of at least $1.34\times10^{-4}$ mm/min.

23. The contact lens of any one of clauses 20-22, wherein the lens body further comprises an anterior surface, a posterior surface shaped for placement on a cornea of an eye, a lens edge circumscribing the lens body, and the ion-permeable portion is present at a region of the lens body extending at least 1.1 mm from the lens edge towards the geometric center of the lens body.

24. The contact lens of any one of clauses 20-23, wherein the ion-impermeable portion constitutes no more than 70% of the area of the lens body when viewed in plan view.

25. The contact lens of any one of clauses 20-24, wherein the ion-impermeable portion comprises at least one electronic component.

26. The contact lens of clause 25, wherein the at least one electronic component comprises at least one electrode, at least one power supply, at least one sensor, or at least one transmitter, or combinations thereof.

27. The contact lens of any one of clauses 20-26, wherein the lens body comprises an optic zone that comprises an electronically adjustable optic.

28. The contact lens of clause 27, wherein the electronically adjustable optic comprises a liquid crystal component, or a fluid filled membrane component.

29. The contact lens of any one of clauses 20-28, wherein the lens body comprises a hydrogel component, a silicone hydrogel component, or a silicone elastomer component, or combinations thereof.

30. A method of making a contact lens, comprising:
forming a lens body from at least one lens forming material, the lens body comprising an ion-impermeable portion, and an ion-permeable portion, wherein the lens body has an average ionoflux transmittance of at least $1.34\times10^{-4}$ mm/min.

31. A method of making a contact lens, comprising:
forming a lens body from at least one lens forming material, the lens body comprising an ion-impermeable portion, and an ion-permeable portion, wherein the lens body has an average thickness of at least 50 micrometers, an ionoflux diffusion coefficient of at least $6.7\times10^{-6}$ mm²/min, and the ion-permeable portion extends radially inwardly from a lens edge circumscribing the lens body by a distance that is at least 7% of a chord diameter of the lens body.

32. A method of making a contact lens, comprising:
forming a lens body from a lens forming material, the lens body comprising an ion-impermeable portion, and an ion-permeable portion,
wherein the ion-impermeable portion comprises an electronically adjustable optic that provides a first refractive power without energy, and adjusts to a different second refractive power upon receiving energy, and at least one additional electronic component to provide the energy to the electronically adjustable optic, and
wherein the ion-permeable portion comprises a hydrogel polymeric material, and the ion-permeable portion is present as an annulus extending radially inwardly from a lens edge circumscribing the lens body by a distance that is at least 7% of a chord diameter of the lens body.

33. A method of making a contact lens, comprising:
forming a lens body from a lens forming material, the lens body comprises an ion-impermeable portion, and an ion-permeable portion, the lens body having an average thickness of greater than 200 micrometers, an ionoflux diffusion coefficient of at least $2.68\times10^{-5}$ mm²/min.

34. The contact lens of any one of clauses 1 to 19, wherein the lens body has an average thickness of at least 200 micrometers, and an ionoflux diffusion coefficient of at least $2.68\times10^{-5}$ mm²/min.

35. The contact lens of clause 34, wherein the lens body exhibits an on-eye movement rate from 0.1 mm/second to 4.0 mm/second.

Although the disclosure herein refers to certain exemplified embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method of making a contact lens, comprising:
forming a lens body from at least one lens forming material, the lens body comprising an ion-impermeable portion, and an ion-permeable portion, wherein the lens body has an average ionoflux transmittance of at least $1.34\times10^{-4}$ mm/min and wherein the lens body comprises an optic zone, and said forming further comprises including an electronically adjustable optic in the lens body.

2. The method of claim 1, wherein said forming of the lens body is by a cast molding process, a spin cast molding process, or a lathing process, or any combination thereof.

3. The method of claim 1, wherein said forming of the lens body comprises coupling together two cast molded components, where one of the cast molded components comprises a hydrogel polymeric material or a silicone hydrogel polymeric material, and the other of the cast molded components comprises a hydrogel polymeric material or a silicone hydrogel polymeric material, or a silicone elastomer material.

4. The method of claim 1, wherein said forming comprising forming the lens body from an ion-permeable material and an ion-impermeable material, and then placing the lens body in a contact lens mold assembly that has a male mold member and a female mold member, and then curing the lens body in the contact lens mold assembly to form a cured lens body, and then removing the cured lens body from the contact lens mold assembly, and optionally washing the cured lens body with or without organic solvents, water, or any combination thereof, and then packaging the cured lens body in a contact lens package and then sealing the contact lens package and sterilizing the contact lens package.

5. The method of claim 1, wherein the lens body comprises a posterior member that is formed from a hydrogel or silicone hydrogel polymeric material, and an anterior member that is formed from a hydrogel or silicone hydrogel polymeric material, and wherein said forming comprises placing a silicone elastomer member, or one or more electronic components, or a combination thereof, on a posterior surface of the anterior member, and placing an anterior surface of the posterior member in contact with the anterior member to sandwich the silicone elastomer member, or the electronic components, or both, between the anterior member and the posterior member.

6. The method of claim 1, wherein the lens body further comprises an anterior surface, a posterior surface shaped for placement on a cornea of an eye, a lens edge circumscribing the lens body, and the ion-permeable portion is present at a region of the lens body extending at least 1.1 mm from the lens edge towards the geometric center of the lens body.

7. The method of claim 1, wherein the ion-impermeable portion comprises at least one additional electronic component.

8. The method of claim 7, wherein the at least one additional electronic component comprises at least one electrode, at least one power supply, at least one sensor, or at least one transmitter, or combinations thereof.

9. The method of claim 1, wherein the electronically adjustable optic comprises a liquid crystal component, or a fluid filled membrane component.

10. A method of making a contact lens, comprising:
forming a lens body from a lens forming material, the lens body comprising an ion-impermeable portion, and an ion-permeable portion,
wherein the ion-impermeable portion comprises an electronically adjustable optic that provides a first refractive power without energy, and adjusts to a different second refractive power upon receiving energy, and at least one additional electronic component to provide the energy to the electronically adjustable optic, and
wherein the ion-permeable portion comprises a hydrogel polymeric material, and the ion-permeable portion is present as an annulus extending radially inwardly from a lens edge circumscribing the lens body by a distance that is at least 7% of a chord diameter of the lens body.

11. The method of claim 10, wherein the electronically adjustable optic comprises a liquid crystal component, or a fluid filled membrane component.

12. The method of claim 10, wherein the annulus of the ion-permeable portion has a radial width of at least 1.1 mm from the lens edge.

13. The method of claim 10, wherein the ion-impermeable portion further comprises a silicone elastomer material.

14. A method of making a contact lens, comprising:
forming a lens body from a lens forming material, the lens body comprises an ion-impermeable portion, and an ion-permeable portion, the lens body having an average thickness of greater than 200 micrometers, an ionoflux diffusion coefficient of at least $2.68 \times 10^{-5}$ mm$^2$/min.

15. The method of claim 14, wherein the lens body further comprises an anterior surface, a posterior surface shaped for placement on a cornea of an eye, a lens edge circumscribing the lens body, and the ion-permeable portion is present at a region of the lens body extending at least 1.1 mm from the lens edge towards the geometric center of the lens body.

16. The method of claim 14, wherein the ion-impermeable portion comprises at least one electronic component.

17. The method of claim 16, wherein the at least one electronic component comprises at least one electrode, at least one power supply, at least one sensor, or at least one transmitter, or combinations thereof.

18. The method of claim 14, wherein the lens body comprises an optic zone that comprises an electronically adjustable optic.

19. The method of claim 18, wherein the electronically adjustable optic comprises a liquid crystal component, or a fluid filled membrane component.

* * * * *